United States Patent [19]
Mangham et al.

[11] Patent Number: 5,556,273
[45] Date of Patent: Sep. 17, 1996

[54] COMBUSTION SYSTEM FOR A STECKLE MILL

[75] Inventors: William J. Mangham, Brookwood; Charles D. McPherson, Mulga; Donald N. Mohr, Northport, all of Ala.

[73] Assignee: Tuscaloosa Steel Corporation, Tuscaloosa, Ala.

[21] Appl. No.: 331,099

[22] Filed: Oct. 28, 1994

[51] Int. Cl.⁶ .................................................. F26B 13/00
[52] U.S. Cl. .............................. 432/8; 432/120; 432/121; 72/240; 72/241.2
[58] Field of Search ................................... 432/1, 8, 120, 432/121; 72/240, 241, 226, 227, 202

[56] References Cited

U.S. PATENT DOCUMENTS

| | | |
|---|---|---|
| 2,639,910 | 5/1953 | Cone et al. . |
| 3,170,681 | 2/1965 | Davies . |
| 3,527,448 | 9/1970 | Ghiea . |
| 4,503,697 | 3/1985 | Tippins et al. . |
| 4,630,352 | 12/1986 | Ginzburg et al. . |
| 4,675,974 | 6/1987 | Connolly . |
| 4,698,897 | 10/1987 | Frommann . |
| 4,793,169 | 12/1988 | Ginzburg . |

OTHER PUBLICATIONS

High Performance Steckle–Type Mill Publication in Hitachi Review, vol. 37, No. 4, Aug. 1988, pp. 195–202.

*Primary Examiner*—Henry A. Bennett
*Assistant Examiner*—Siddmarth Ohri
*Attorney, Agent, or Firm*—Bacon & Thomas

[57] ABSTRACT

A combustion system for use in the steckel mill provides for the controlled mixing of combustible fluids to each furnace incorporated in the steckel mill while also harnessing at least a portion of the heat developed during the operation of the mill to increase the overall operation efficiency of the steckel mill. The invention also contemplates enhancing the manner in which combustion products are drawn from the furnaces which also aids in recovering heat developed during the operation of the steckel mill as well as improving the operation of the overall combustion system. These features are obtained by providing a supply system for the air or other combustible gas delivered to each of the steckel mill coil furnaces and to direct at least a portion of the flow of this combustion gas through at least one recuperator that is in-line with an exhaust duct associated with the steckel mill. In this manner, this portion of the intake combustion gas is pre-heated prior to delivery to the various burners of the coil furnaces which results in an increased overall operation efficiency of the furnaces and steckel mill. A controlled rate of auxiliary combustion gas is also supplied to burners of the furnaces for mixing with a combustible gas, such as natural gas, in order to maintain a desired stoichiometric combustion ratio.

14 Claims, 9 Drawing Sheets

COMBUSTION SYSTEM FOR A STECKLE MILL

BACKGROUND OF THE INVENTION

1. Field of the Invention

The present invention pertains to a steckel mill that includes multiple coil furnace units respectively positioned upstream and downstream of an adjustable roller assembly through which a slab of metal is repeatedly passed in order to produce a progressively thinned and elongated metal sheet and, more particularly, to a combustion system for supplying a combustible mixture to each of the coil furnace units and for exhausting combustion products therefrom.

2. Discussion of the Prior Art

Rolling mills are commonly used for producing elongated metal sheets for various applications. In general, such rolling mills receive a slab of metal which is heated and is caused to pass between at least one pair of rollers of a roller assembly in order to thin and lengthen the metal slab. In certain known types of rolling mills, the slab is serially passed through various roller assemblies in a heated state. Each of these roller assemblies have associated spacings through which the metal slab passes which are progressively made smaller such that the slab is continually thinned as it passes through the rolling mill until an elongated metal sheet is produced. The elongated metal sheet can then be wrapped by means of a coiler for various uses.

Due to the number of and required spacing between the various roller assemblies in such a rolling mill, it has also been heretobefore proposed to produce an elongated metal sheet from a metal slab by utilizing a reverse rolling or steckel mill. FIG. 1 schematically illustrates a typical milling operation incorporating a steckel mill. This milling system, generally indicated at 1, receives a supply of metal from a continuous casting machine 5. Instead of continuous casting machine 5, a slab of metal can also be introduced into the through a heating furnace 9 and, if necessary, through a roughing roller-type mill unit 11. In some applications, roughing roller-type mill 11 is made reversible such that the slab or metal can be passed therethrough various times in order to obtain a slab having a certain thickness which is then passed to the steckel mill generally indicated at 15. Once the metal is elongated into a sheet in steckel mill 15, it proceeds to a cooling zone 18 and then is delivered over a guide roller 21 to a coiling device 24.

Steckel mill 15 typically includes first and second coil furnaces located within housings 28 and 29. Housings 28 and 29 each rotatably house a drum 32, 33 which are adapted to alternatively coil and uncoil a strip of metal indicated at 38. Metal strip 38, for instance, extends through an opening 40 in first housing 28, between rollers of a guide unit 42, between the rollers of a rolling mill assembly generally indicated at 46, through a second guide roller unit 48 and into second housing 29 through an opening 50. As is known in the art, the area through which strip 38 must pass within rolling mill assembly 46 is adjustable such that, as strip 38 is repeatedly passed through milling roller assembly 46 and alternatively coiled within housings 28 and 29, the thickness of strip 38 is systematically reduced commensurate with the elongation of strip 38. In order to maintain strip 38 in a flexible state for coiling and to enable strip 38 to be thinned out as it is passed through milling roller assembly 46, each housing 28 and 29 includes a coil furnace as discussed above to heat strip 38.

For this purpose, known steckel mills generally incorporate a plurality of burners which operate at a temperature in the order to 2000°–3000° F. The temperature of the waste gas or combustion products associated with such a steckel mill is often greater than 2000° F. Currently, in the operation of known steckel mills, this flow of combustion products is merely exhausted into the atmosphere. This results in an extreme waste of energy and does not represent an efficient combustion system.

Therefore, in the art of steckel mills, there exists a need for a combustion system wherein at least a portion of the heat generated for heating of the metal passing through the steckel mill is recouped and utilized to increase the overall efficiency of the milling operation. There also exists a need in the art for an overall combustion system which assures an adequate and controlled combustion mixture to each of the coil furnaces incorporated in the steckel mill while providing for an economical and efficient manner of exhausting the combustion products produced during operation of the steckel mill.

SUMMARY OF THE INVENTION

The present invention provides a combustion system for use in the steckel mill that provides for the controlled mixing of combustible fluids to each of the furnaces incorporated in the steckel mill while also harnessing at least a portion of the heat developed during the operation of the mill which is used to increase the overall operation efficiency of the steckel mill. The invention also contemplates enhancing the manner in which combustion products are drawn from the furnaces which also aids in recovering heat developed during the operation of the steckel mill as well as improving the operation of the overall combustion system. These features of the invention are obtained by providing a supply system for the air or other combustible gas delivered to each of the steckel mill coil furnaces and to direct at least a portion of the flow of this combustion gas through at least one recuperator that is in-line with an exhaust duct associated with the steckel mill. In this manner, this portion of the intake combustion gas is pre-heated prior to delivery to the various burners of the coil furnaces which results in an increased overall operation efficiency of the furnaces and steckel mill. A controlled rate of auxiliary combustion gas is also supplied to the burners for mixing with a combustible fluid, such as natural gas, in order to maintain a desired stoichiometric combustion ratio.

In addition, a branch line in the combustion gas (air) supply line is delivered through a nozzle to a venturi section of an eductor which is positioned in the exhaust path between the recuperator and atmosphere. The eductor functions to create a vacuum in the exhaust path which enhances removal of the combustion products from the various burners of the coil furnaces as well as maintains a desired flow rate of exhaust through the recuperator for the purpose of pre-heating the intake air.

The present invention also contemplates a specific configuration of the recuperator which enhances its heat transfer capabilities, as well as a preferred arrangement and interconnection between the various components of the combustion system which provides for a relatively compact arrangement.

These and other objects, features and advantages of the present invention will become more readily apparent from the following detailed description of a preferred embodiment thereof when taken in conjunction with the drawings wherein like reference numerals refer to corresponding parts and several views.

DETAILED DESCRIPTION OF THE PREFERRED EMBODIMENT

Figure 1:
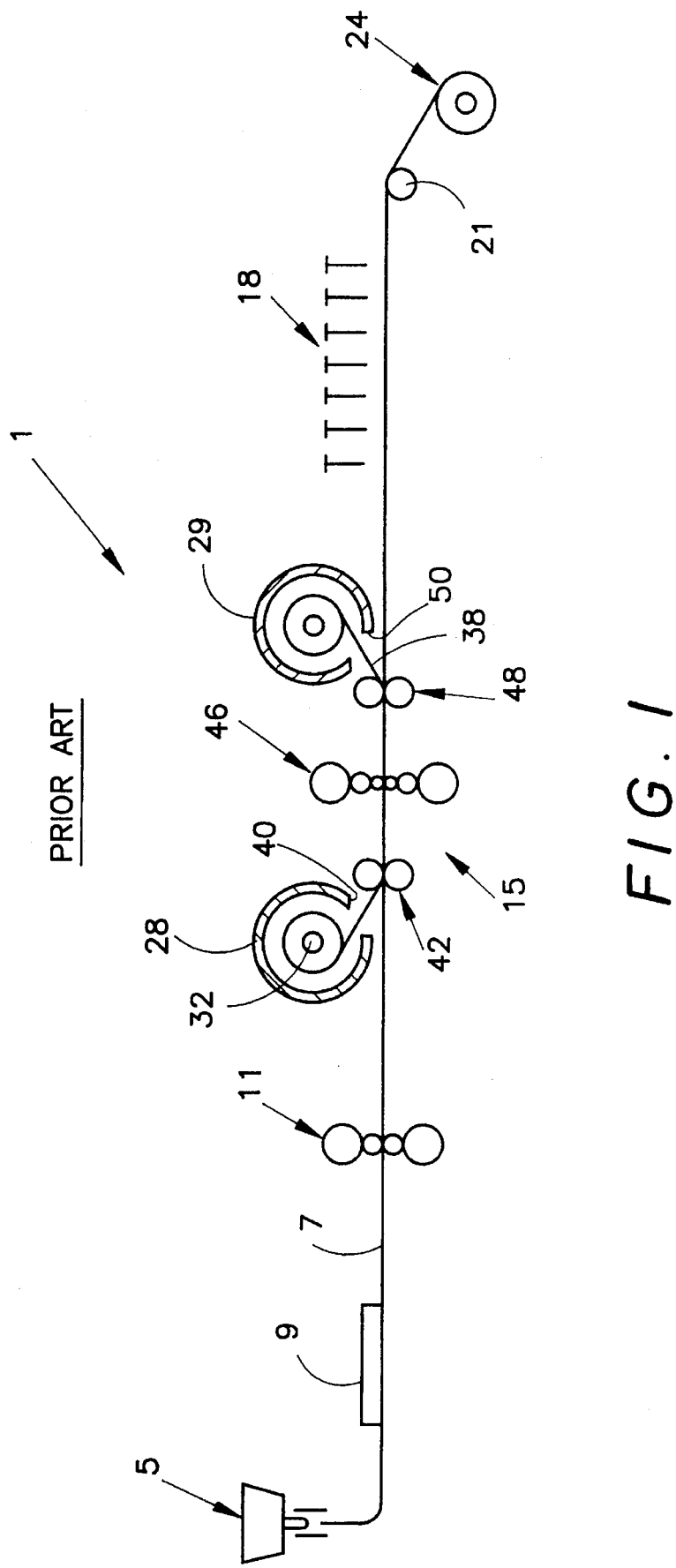
FIG. 1 schematically illustrates a typical steckel mill system known in the art.
Figure 2:
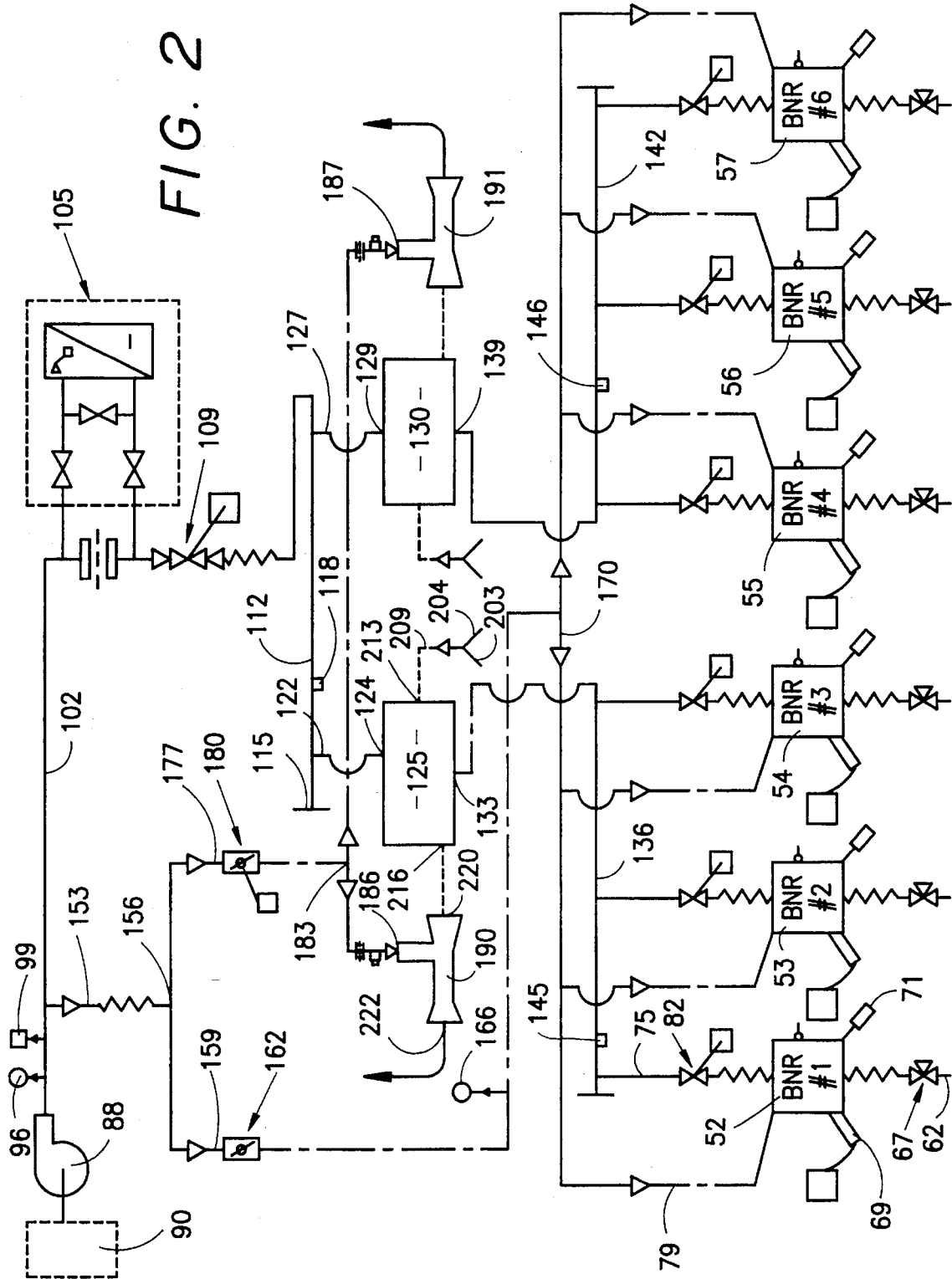
FIG. 2 schematically illustrates the combustion system according to the present invention.

With initial reference to FIG. 2, a detailed description of the combustion system of the present invention as incorporated in each of the first and second coil furnaces of steckel mill 15 will now be described. FIG. 2 schematically depicts the combustion system for each of the furnaces that includes first and second sets of burners 52–54 and 55–57 respectively. Since the structure and operation of each burner unit 52–57 is identical, a detailed description with reference to burner 52 will now be described and it is to be understood that furnace 53–57 are structured and operated in a corresponding manner.

Burner 52 is supplied with a combustible fluid, such as natural gas, by means of a combustible fluid supply line 62. The flow rate through combustible fluid supply line 62 can be selectively controlled by means of a combustible fluid intake control valve 67. Burner 52 is also provided with a spark igniter unit 69 and a temperature sensor 71. In addition to the flow of natural gas or other combustible fluid through supply line 62, burner 52 receives a supply of combustible gas, preferably air, that is adapted to be mixed and ignited with the combustible fluid supplied through line 62. For this purpose, burner 52 is connected to a first intake combustible gas supply line 75 and a second intake combustible supply line 79. As depicted in FIG. 2, first intake combustible gas supply line 75 is provided with an adjustable flow control valve 82.

With continued reference to FIG. 2, a detailed description of the complete air supply arrangement incorporated in the combustion system of the present invention will now be described. A blower 88 draws in air through an inlet 90 that can include a filter (not shown). Blower 88 is also connected to an air output line 93 which, in the preferred embodiment, is provided with an air pressure gauge 96 and a pressure control unit 99 in the form of a switching unit. Downstream of gauge 96 and pressure control unit 99, air output line 93 flows into a main air supply line 102. Main air supply line 102 is preferably provided with a control unit 105 for monitoring the flow of air therethrough. Main air supply line 102 is also provided with an adjustable flow control valve 109 which leads to a first manifold section 112. As illustrated in FIG. 2, first manifold section 112 includes a closed end 115 and is preferably provided with a pressure tap 118.

From first manifold section 112 stems a first line 122 that is connected to an inlet port 124 of a first recuperator 125 and a second line 129 which is connected to an inlet port 129 of a second recuperator 130. The structure and function of first and second recuperators 125 and 130 will be more fully described below. First recuperator 125 includes an outlet port 133 that is in fluid communication with inlet port 124 and which leads to a second manifold section 136. In a similar manner, second recuperator 130 includes an outlet port 139 which is connected with a third manifold section 142. Second and third manifold sections 136 and 142 are each preferably provided with pressure taps 145 and 146 respectively. First intake combustible gas supply line 75 receives a flow of combustible gas through second manifold section 136. In a similar manner, burners 53–56 also receive a corresponding supply of combustible gas from their respective manifold sections 136 and 142.

Also connected to air output line 93 is an auxiliary air supply line 153 which is arranged parallel to main air supply line 102. Auxiliary air supply line 153 splits at 156 and is connected to a supplemental air supply line 159 that is provided with a pressure regulating valve 162 and a pressure gauge 166. Supplemental air supply line 159 flows into an auxiliary air manifold 170 which is connected to each second intake combustible gas supply line 79. Therefore, in a similar manner, burners 52–57 receive an auxiliary supply of combustible gas delivered through auxiliary air manifold 170. The supply of auxiliary combustible gas (air) through second intake combustible gas supply line 79 to burner 52 is controlled through the use of pressure regulating valve 162 in order to, in combination with the supply of combustible gas through first intake combustible gas supply line 75, obtain a desired stoichiometric combustible mixture within burner 52. Therefore, depending upon the desired operating temperature of burner 52 as checked by temperature sensor 71, pressure regulating valve 162 can be adjusted to selectively increase or decrease the amount of auxiliary combustible gas supplied thereto.

At splitting point 156, auxiliary supply line 153 also flows into a branch line 177 that is provided with its own pressure regulating valve 180. Downstream of pressure regulating valve 180, branch line 177 is split at 183 and is connected to vacuum creating inlet ports 186 and 187 of eductors 190 and 191 respectively. The specific structure and function of eductors 190 and 191 will be detailed more fully below.

Figure 3:
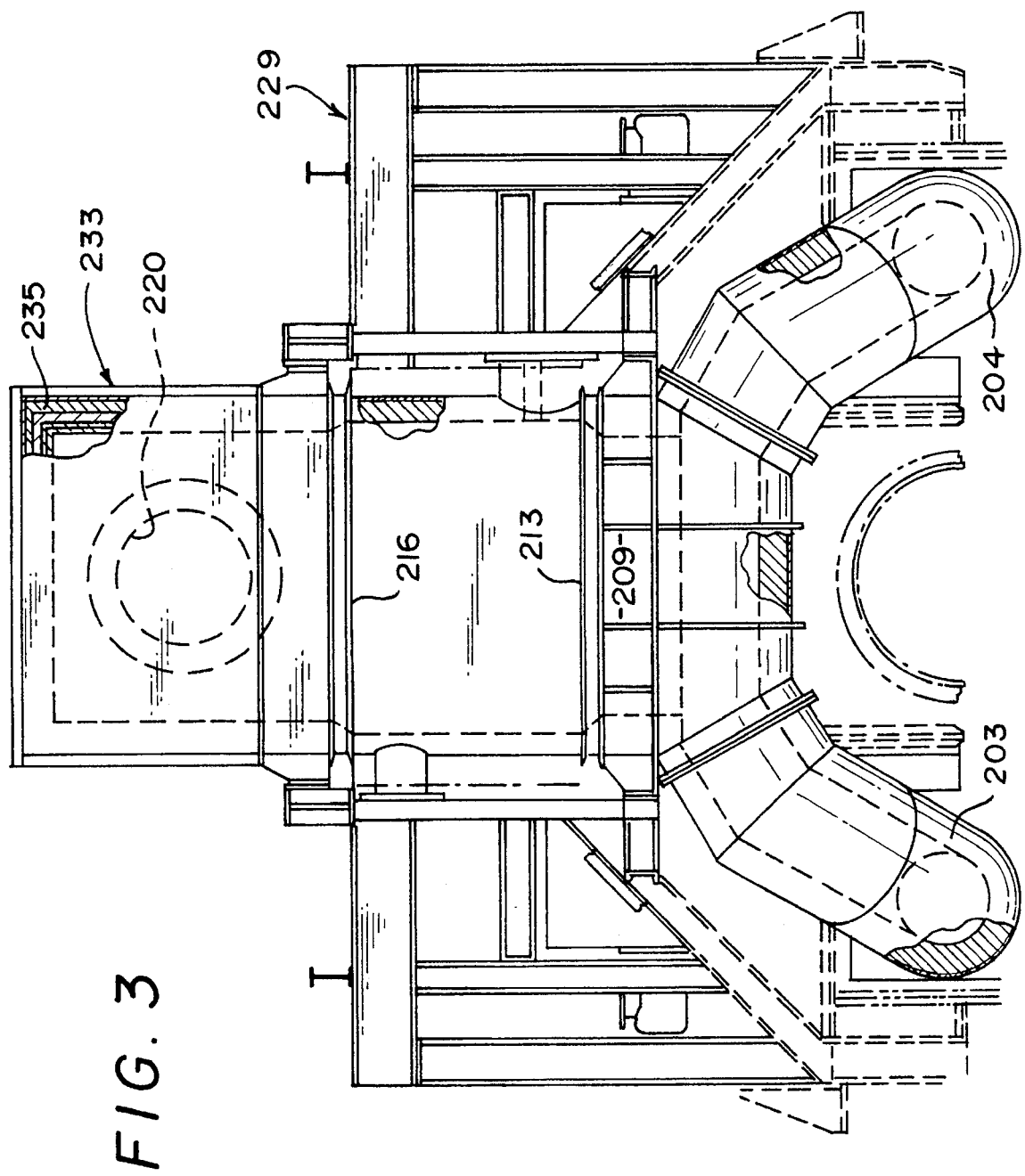
FIG. 3 is a plan view of various components of the combustion system of FIGS. 2.
Figure 4:
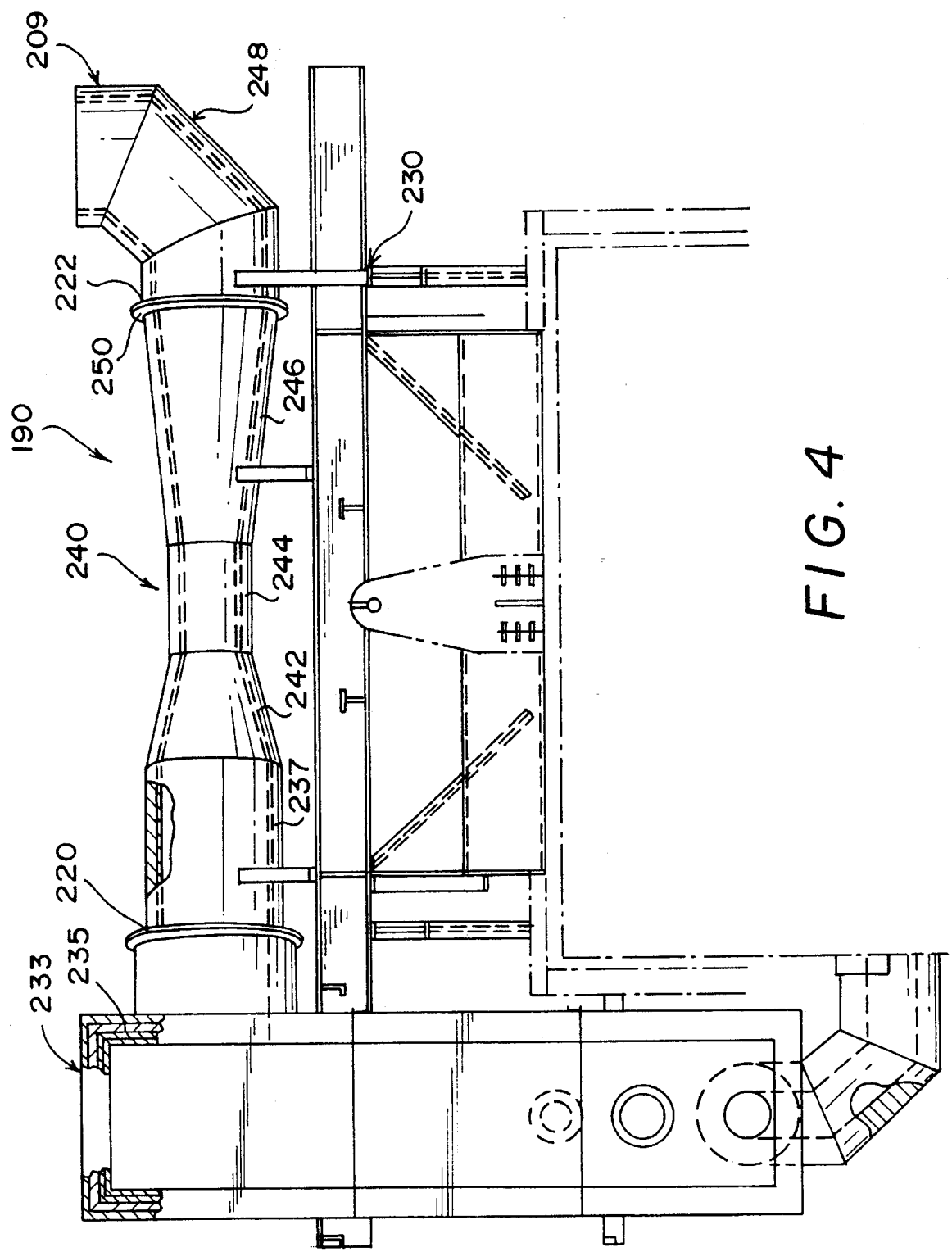
FIG. 4 is a side view of some of the components illustrated in FIG. 3.

Reference will now be made to FIGS. 2–4 in describing in detail the exhaust arrangement incorporated in the combustion system of the present invention. Since the exhaust arrangement for burners 55–57 is identical to that associated with burners 52–54, a detailed description of the exhaust arrangement for burners 52–54 will be provided below and it is to be understood that an analogous arrangement is utilized for burners 55–57. As shown in detail in FIGS. 3 and 4 and schematically illustrated in FIG. 2, combustion products from burners 52–54 flow into exhaust flues 203 and 204 which merge into a common exhaust duct 209. Exhaust duct 209 is connected to a first, open side 213 of recuperator 125 and extends out an opposing side 216. Exhaust duct 209 is then attached to an exhaust inlet port 220 of eductor 190. After flowing through eductor 190, the combustion products from burners 52–54 flow out an exhaust outlet port 222 of eductor 190 and are vented to atmosphere.

Figure 5:
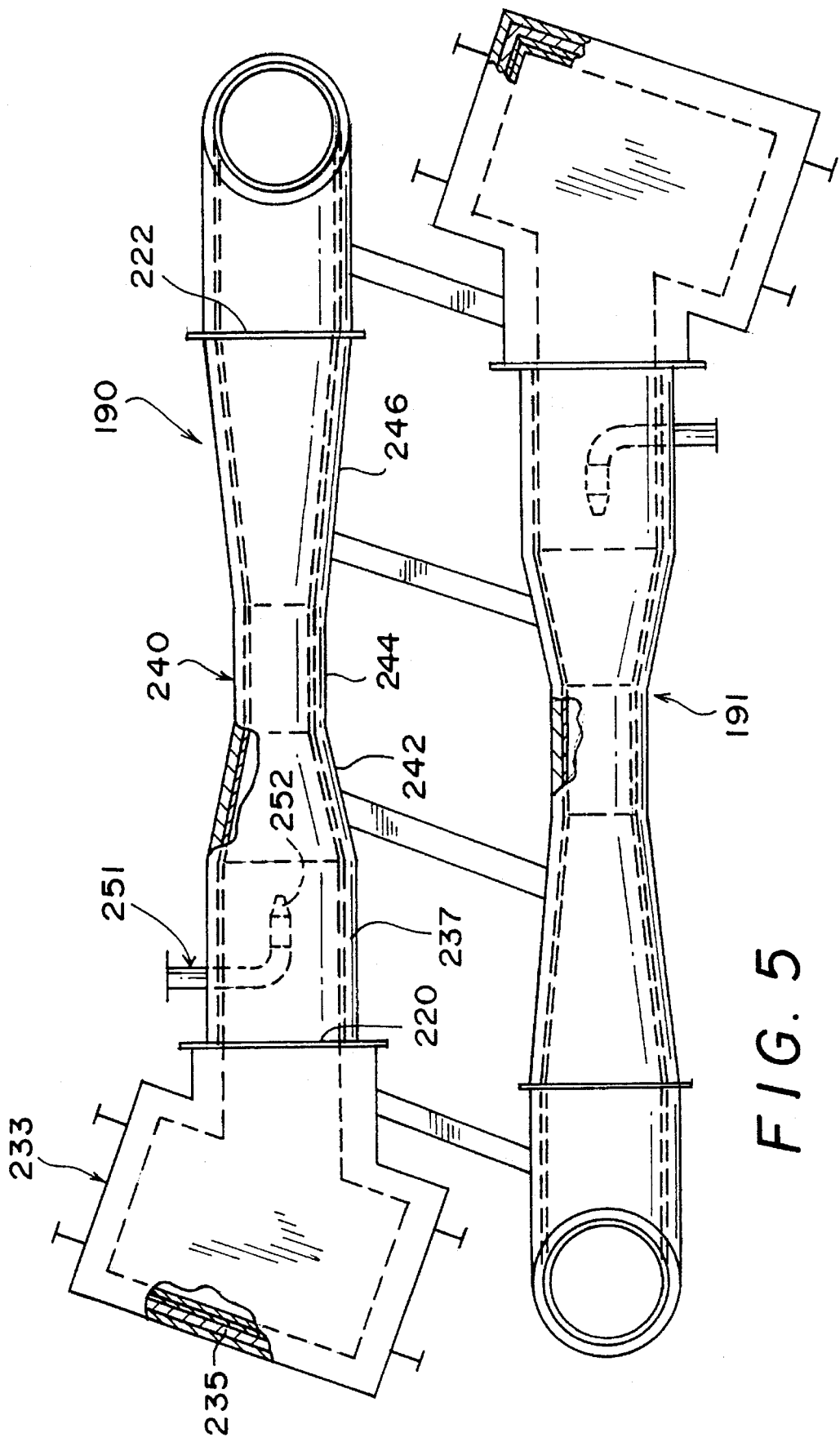
FIG. 5 is a top view of two eductor units incorporated in the combustion system of FIG. 2.
Figure 6:
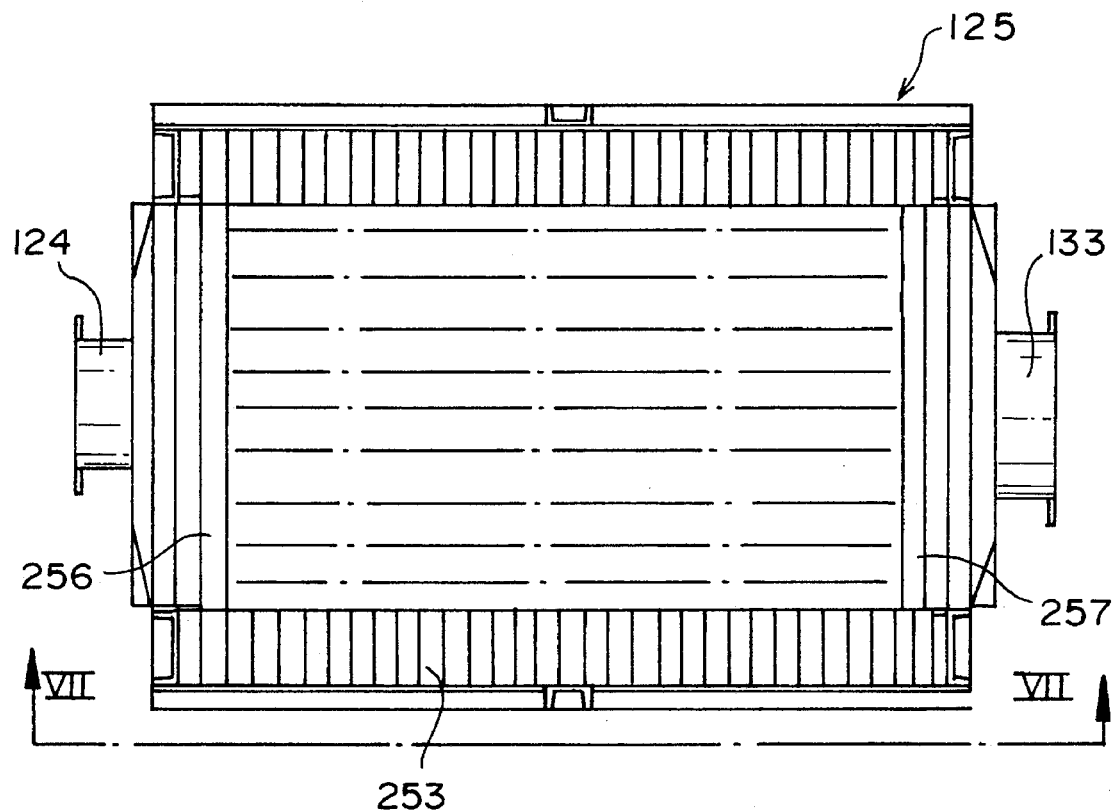
FIG. 6 is a top view of a recuperator constructed in accordance with a preferred embodiment and utilized in the combustion system of FIG. 2.

Reference will now be made to FIGS. 3–5 in describing the particular construction of eductor 190 and its interconnection with recuperator 125. In FIGS. 3 and 4, there is illustrated various supporting structure generally referenced by numbers 229 and 230. This supporting structure is only shown for the sake of completeness and is utilized to stabilize recuperator 125 and eductor 190 in a desired manner. Since the specific configuration and arrangement of supporting structures 229 and 230 are not considered part of the present invention, they will not be further discussed herein in detail. FIG. 3 illustrates the connection between the exhaust flues 203, 204, exhaust duct 209, recuperator 125 and an exhaust transfer housing 233 (also see FIG. 4) which is provided with various insulating layers generally indicated at 235 and which leads to exhaust inlet port 220 of recuperator 190. Recuperator 190, as best illustrated in FIG. 4, includes a uniform diameter section 237 and a venturi section 240 defined by a first tapering section 242, a uniform reduced diameter section 244 and a second tapering section 246. Second tapering section 246 is connected to an angled portion 248 of exhaust duct 209 through a flange connection 250. Angled portion 248 leads the supply of combustion products to atmosphere, preferably through a filtering unit or even an afterburner arrangement (not shown).

FIG. 5 best illustrates the layout and interconnection between eductors 190 and 191. As shown, eductors 190 and 191 are preferably arranged adjacent to each other and extend in opposite directions. Due to the end construction of the eductors 190 and 191, this provides for a rather compact arrangement. In combination with the manner in which exhaust flues 203, 204, exhaust duct 209, recuperators 125, 130 and eductors 190 and 191 are arranged and interconnected as illustrated in these figures, an overall compact configuration for the combustion system of the present invention is also achieved. This is important given the overall concept behind the use of steckel mills and the need for rather large supporting structure such as illustrated at 229 and 230. Since many of the components incorporated in the combustion system of the present invention are extremely heavy, for instance each recuperator 190, 191 incorporated in the present invention weighs approximately 3100 lbs., supporting structures 229, 230 generally take the form of I-beams and other heavy-duty construction framework members. By arranging the components of the combustion system, in particular the recuperators and eductors, in the manner shown, a minimal amount of supporting structure and space is required.

FIGS. 5 also illustrates the presence of a nozzle 251 provided within uniform diameter section 237 of eductor 190. Nozzle 251 includes an end portion 252 which is preferably aligned at the longitudinal centerline of venturi section 240 of eductor 190. The other end of nozzle 251 constitutes inlet port 186 of eductor 190 as discussed above. As generally known in the art of eductors, the flow of high pressure fluid through nozzle 251 and venturi section 240 creates a vacuum in uniform diameter section 237 which functions to aid in drawing a flow of fluid, in this case the combustion products from burners 52–57, through eductors 190 and 191 and out to atmosphere. In the combustion system of the present invention, eductors 190 and 191 function to enhance the flow of combustion products through recuperators 125 and 130 respectively. As will be detailed more fully below, the flow path of the combustion products through recuperators 125 and 130 are arranged in heat transfer relationship with the flow of air through recuperators 125 and 130 from main air supply line 102. In this manner, the heat associated with the combustion products flowing through recuperators 125 and 130 can be used to pre-heat the air or other combustible fluid flowing through recuperators 125 and 130 which results in an increase in combustion efficiency of burners 52–57.

Figure 7:
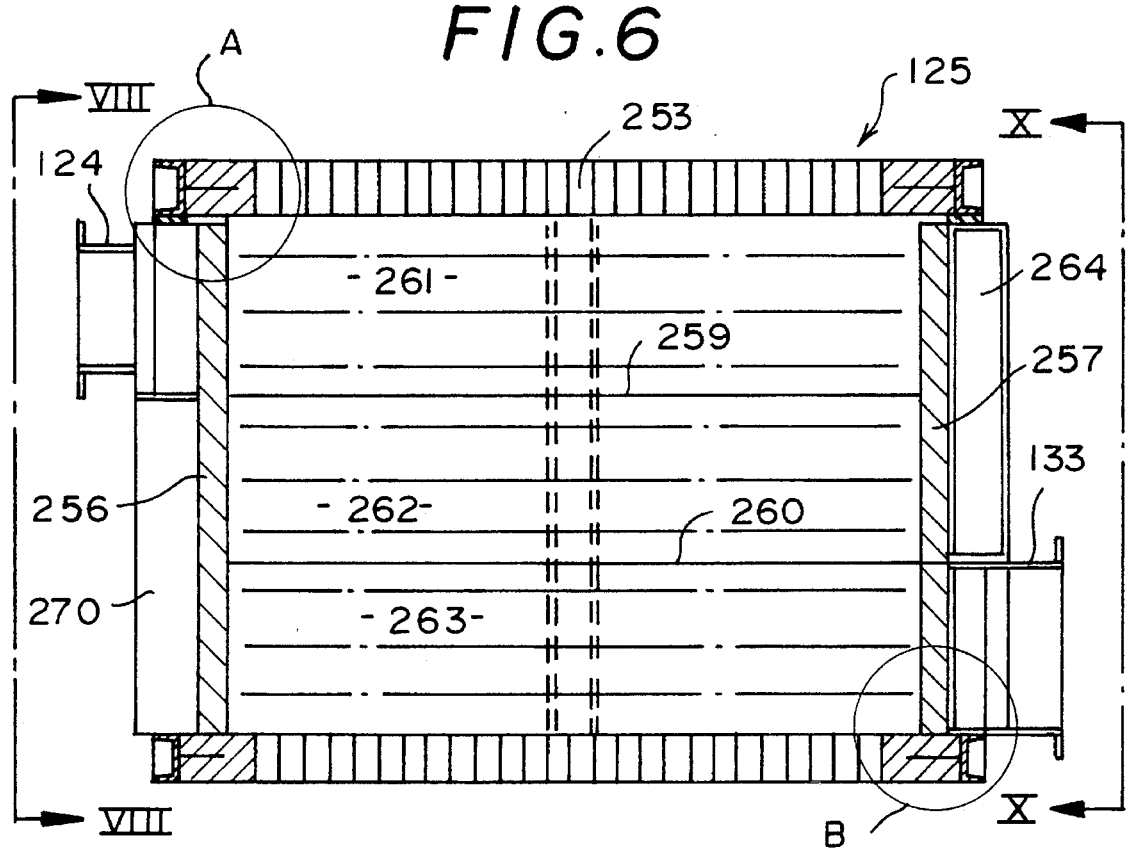
FIG. 7 is a view generally taken along line VII—VII of FIG. 6.
Figure 8:
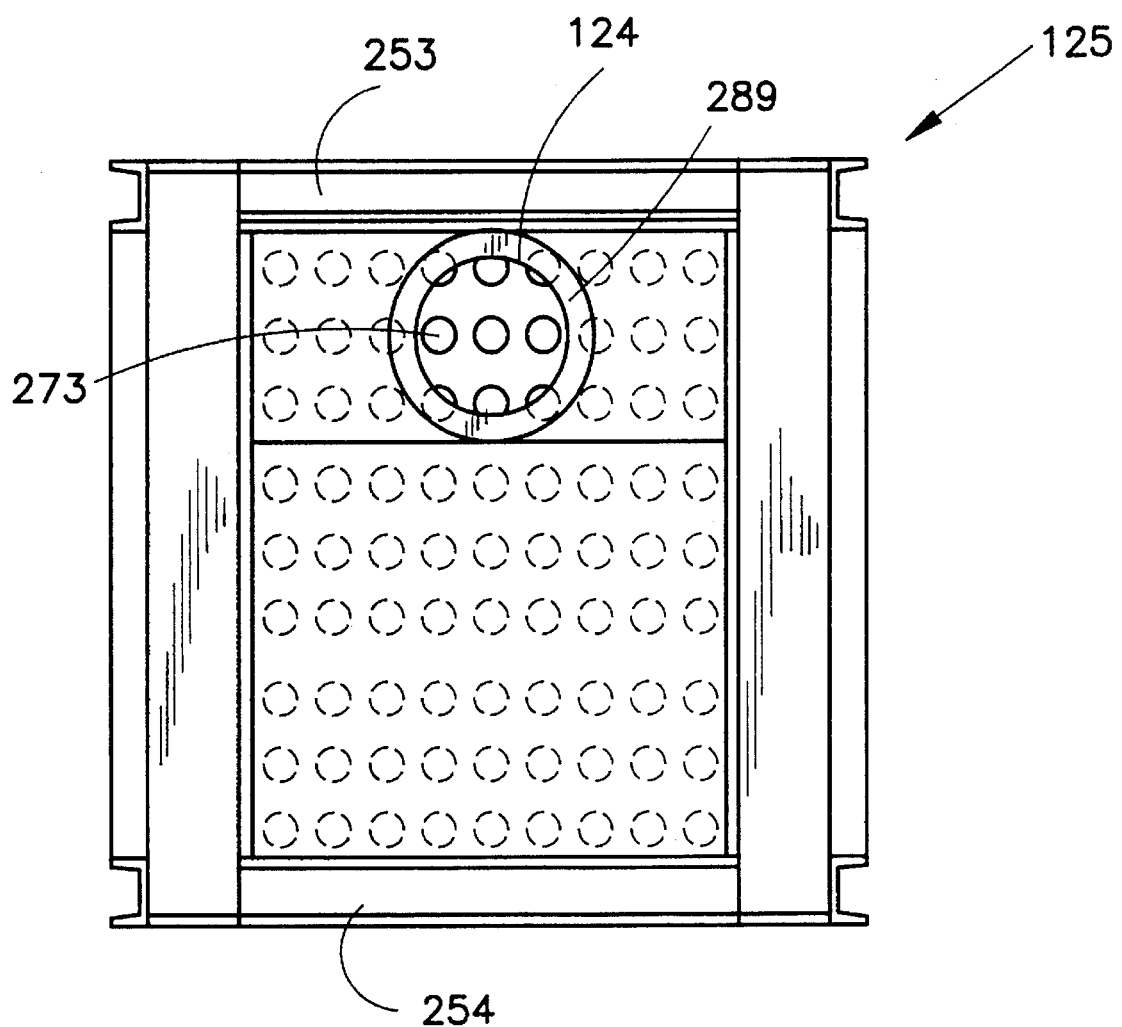
FIG. 8 is a side view of the recuperator shown in FIG. 7 as generally taken along the line VIII—VIII of FIG. 7.

Additional features of this heat transfer relationship will become more readily apparent from a description of the specific construction of recuperator 125 as will now be made with reference to FIGS. 6–13. Although these figures have been shown to illustrate recuperator 125, it should be understood that recuperator 130 incorporates corresponding structure and therefore, to avoid merely duplicating the description of these parts, a separate detailed description of recuperator 130 is not provided herein. Recuperator 125 constitutes an enclosure defined by opposing side walls 253 and 254 as well as end plates 256 and 257. Between side walls 253 and 254, recuperator 125 is open prior to having exhaust duct 209 secured thereto in the manner illustrated in FIG. 3. In the preferred embodiment, recuperator 125 is internally provided, as best shown in FIG. 7, with upper, central and lower channels 261–263 respectively delineated by lines 259 and 260. As best shown in FIGS. 7 and 8, inlet port 124 is secured to end plate 256 and opens into upper channel 261. At its other end, upper channel 261 opens, through end plate 257, into a first transfer duct 264. First transfer duct extends along end plate 257 between upper channel 261 and central channel 262. First transfer duct also opens into central channel 262 such that the flow of combustion gas entering recuperator 125 through intake port 124 will flow through upper channel 261, into first transfer duct 264 and then through central channel 262. The flow of combustible gas will then pass through an opening in end plate 256 and into a second transfer duct 270. Second transfer duct 270 is in fluid communication with both central channel 262 and lower channel 263. Therefore, the flow of combustible gas entering second transfer duct 270 from central channel 262 will be directed into lower channel 263 and then to outlet port 133.

Although various structure could be utilized to define upper, central and lower chambers 261–263, recuperator 124 preferably includes a plurality of pipes 273 that extend between end plates 256 and 257 and through which the combustible gas flows. In the preferred embodiment, each channel 261–263 is provided with matrix of tubes or pipes 273 (see FIGS. 8, 10, 12 and 13). The tubes 273 are preferably utilized due to the extreme temperature environment within which recuperator 125 is utilized. These extreme temperatures can cause a great amount of expansion of tubes 273. For example, in the preferred embodiment, recuperator 125 is provided with 81 tubes, with each channel 261–263 being nine tubes wide and three tubes high. Tubes 273 preferably constitute 2" material grade stainless (309) steel pipes that have an effective length between end plates 256 and 257 of approximately 4 feet 10 inches. Each recuperator 125, 130 is designed for 7 mm BTU/hr heat capacity with natural gas being utilized as the combustible fuel. With an exhaust product temperature of approximately 2100° F. entering recuperator 125, the combustible air flowing through recuperator 125 will be heated to approximately 1100° F. for delivery to burners 52–54.

Figure 9:
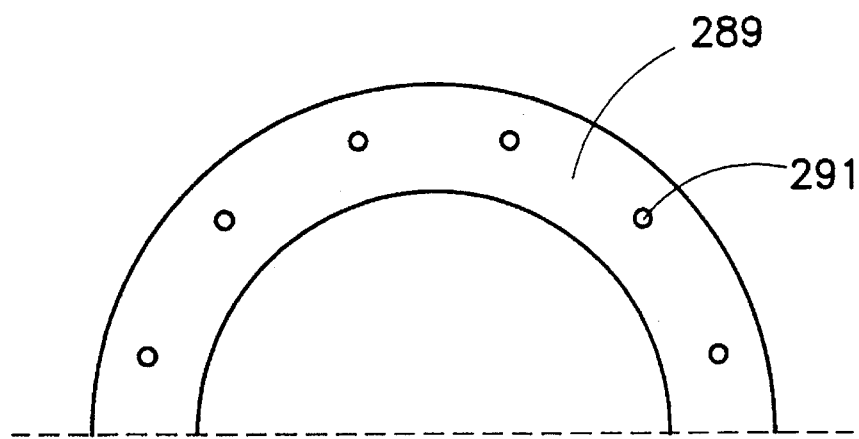
FIG. 9 is an enlarged view of a portion of the intake port for the recuperator shown in FIG. 8.
Figure 10:
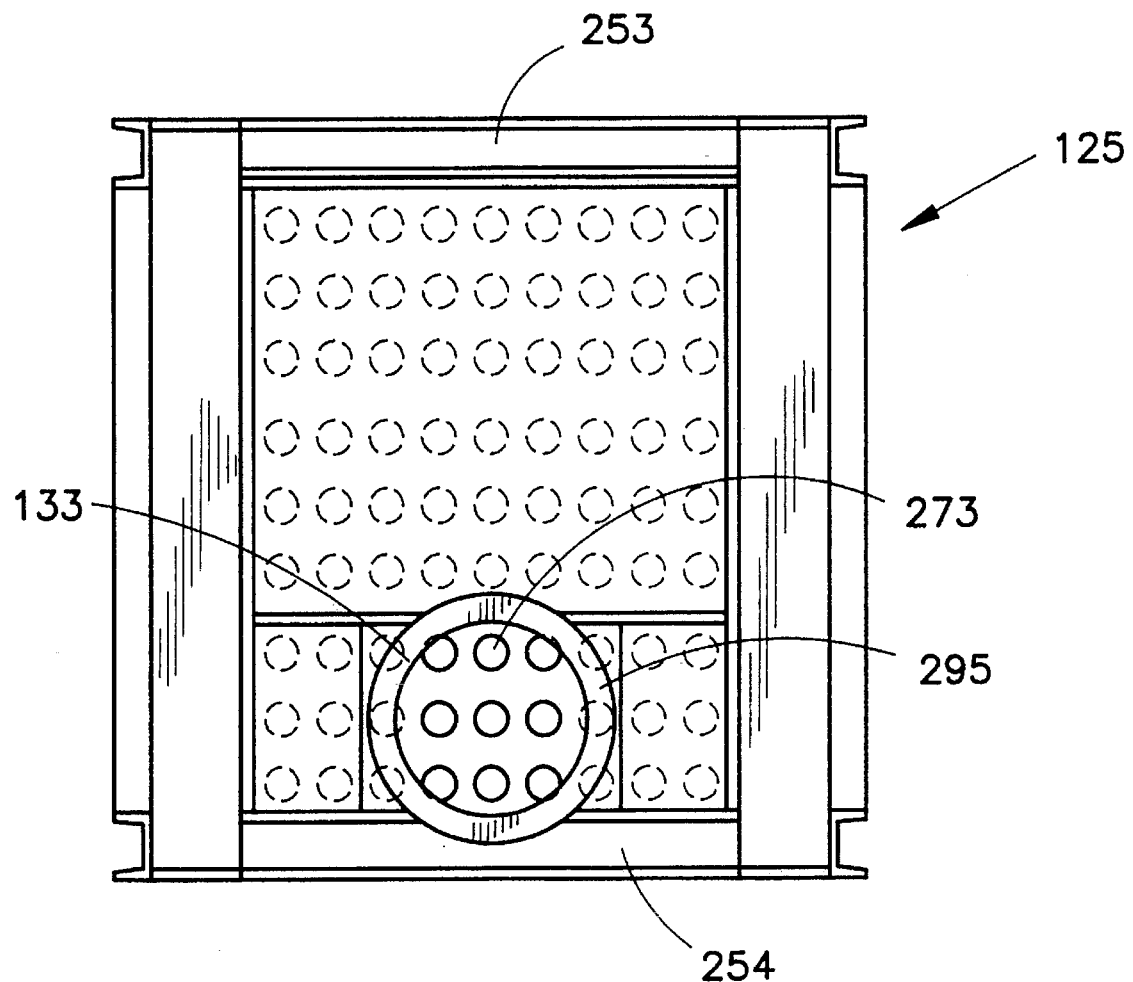
FIG. 10 is a side view of the recuperator shown in FIG. 7 as generally taken along the lines of X—X of FIG. 7.
Figure 11:
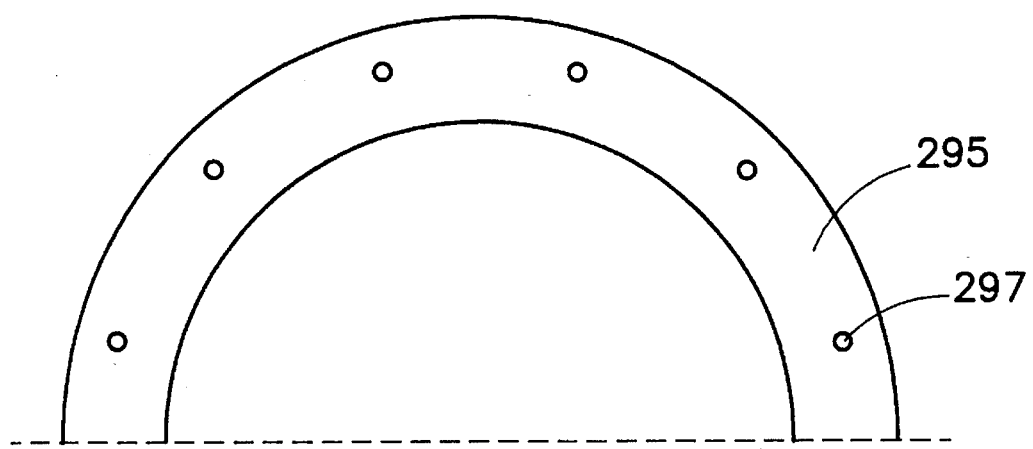
FIG. 11 is an enlarged view of a portion of the outlet port for the recuperator shown in FIG. 10.
Figure 12:
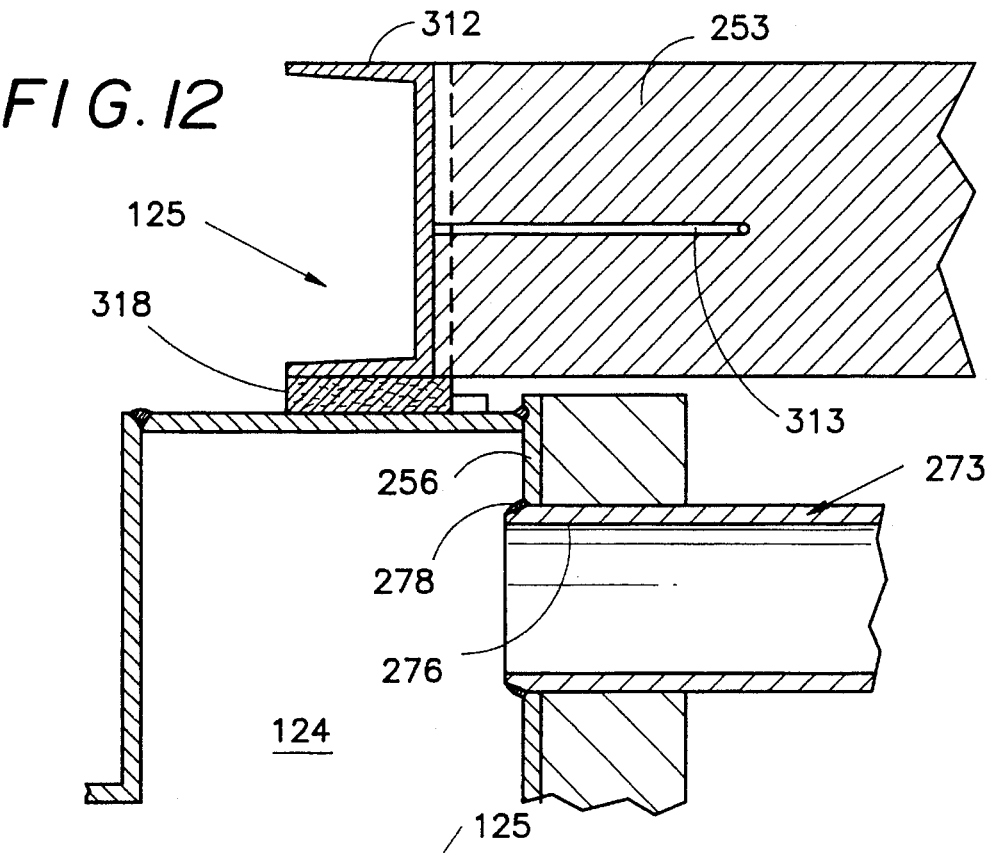
FIG. 12 is an enlarged view of portion A of the recuperator shown in FIG. 7.
Figure 13:
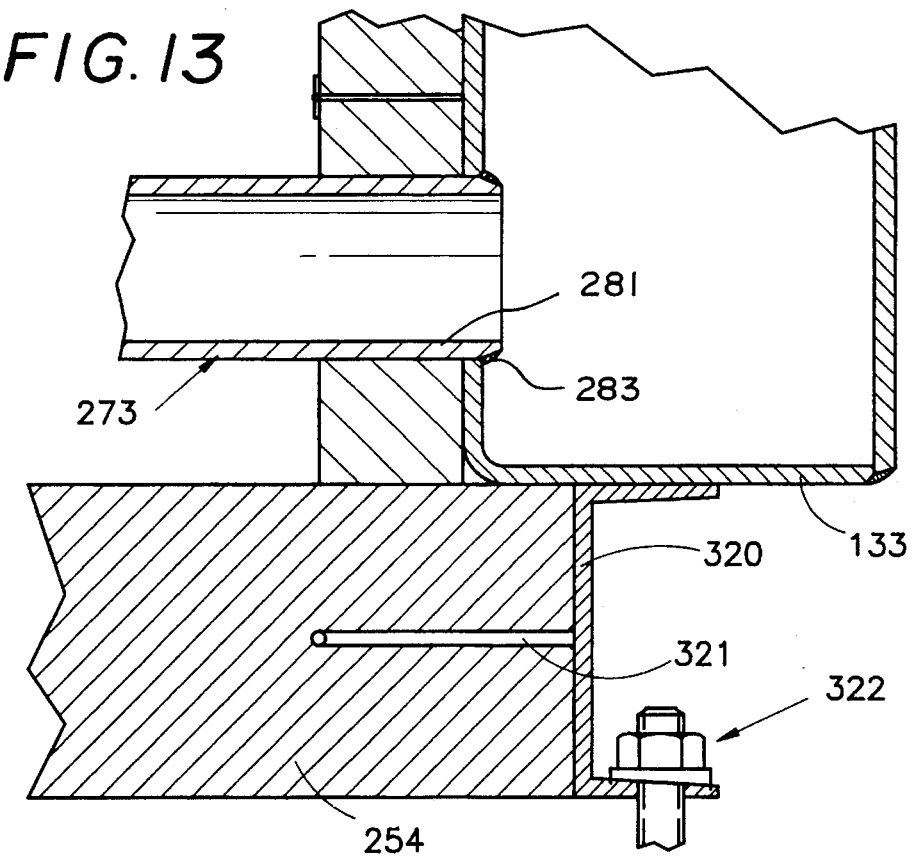
FIG. 13 is an enlarged view of portion B of the recuperator shown in FIG. 7.

With these temperatures, the heat expansion of tubes 273 is in the order to ¾ of an inch. In order to maintain a hermetically sealed recuperator arrangement, these expansion factors must be taken into full consideration. Therefore, in the preferred embodiment, each tube 273 preferably includes a first end 176 which is welded at 278 to end plate 256 as best shown in FIG. 12 and a second end 281 which is welded at 283 to end plate 257 as shown in FIG. 13. Since the volume of gas will expand as heated within recuperator 125, inlet port 124 is made, in accordance with the preferred embodiment of the invention, smaller in diameter than outlet port 133. This can be best seen in comparing FIGS. 8 and 9 with FIGS. 10 and 11. In FIG. 8, inlet port 124 provides for an opening having a diameter substantially equal to the distance across three tubes 273. The end of inlet port 124 is provided with a flange 289 as best shown in FIGS. 8 and 9 which is provided with a plurality of holes 291 for attaching inlet port 124 to first line 122. As shown in FIGS. 10 and 11, outlet port 133 of recuperator 125 has an associated diameter which is approximately equal to the distance across four tubes 273. As shown in FIGS. 10 and 11, outlet port 133 is also provided with a flange 295 provided with a plurality of holes 297 for attaching outlet port 133 to second manifold section 136. This increase in the size of outlet port 133 as compared to inlet port 124 compensates for the expansion of the combustion gas such that a substantially constant pressure is maintained between first line 122 and second manifold section 136.

FIGS. 12 and 13 also illustrate additional construction features of the present invention. As shown in FIG. 12, recuperator 125 is provided with a first support bracket 312 that is attached to side wall 253 by means of anchoring members 313 that are welded to support bracket 312. Support bracket 312 is spaced from inlet port 124 by means of packing 318 which permits thermal expansion between these members as well. As shown in FIG. 13, a second support bracket 320 is secured to outlet port 133 and to second side wall 254 by means of a plurality of anchoring members 321 which are welded to second support bracket 320. Support brackets 312 and 320 are adapted to be attached to supporting structure 229 and/or 230 of FIGS. 3 and 4 by means of nut/bolt assemblies as generally indicated at 322 in FIG. 13. Supporting brackets 312 and 320 are specifically provided to alleviate inlet and outlet ports 124 and 133 from supporting recuperator 125. In other words, no weight of recuperator 125 is carried by inlet and outlet ducts 124 and 133 regardless of the expansion of pipes 273. Instead, all of the weight is transferred to supporting brackets 312 and 320 and, correspondingly, supporting structure 229 and 230.

From the above description, it should be readily apparent that each coil furnace of steckel mill 15 is provided with two recuperators 125 and 130. Each recuperator 125, 130 consists of a completely welded three-pass unit with tubes 273 which are preferably arranged horizontal and is supported by framework which is incorporated by the insulated housing of the recuperator 125, 130. The housing also forms the vertical exhaust duct through which the flow of combustion products from burners 52–57 extend. The combustible gas (air) entering each recuperator 125, 130 passes three times in a counter-flow pattern with respect to the flow of combustion products such that a suitable amount of heat transfer can occur. In the preferred embodiment, the non-heated combustion gas enters a respective recuperator 125, 130 at the top thereof and the combustion products or waste gases enter the respective recuperator 125, 130 at the bottom which also aids in the overall heat transfer relationship.

Although not described, the entire operation of the combustion system of the present invention is preferably automated such that the various flow control and pressure valves as discussed above are adjusted by output signals from a control unit in response to pressure and temperature readings throughout the system. Since such a controlled arrangement is considered to be well within the scope of one or ordinary skill in the art and similar arrangements are currently in-use in known milling systems, it will not be further discussed herein in detail.

It should be recognized that various changes/or modifications can be made to the combustion system of the present invention as described above without departing from the spirit of the invention. In general, the invention is only intended to be limited by the scope of the following claims.

We claim:

1. In a steckel mill including first and second coil furnace units respectively positioned upstream and downstream of an adjustable roller assembly through which a slab of metal is repeatedly passed in order to produce a progressively thinned and elongated metal sheet that is alternately heated and coiled within the first and second coil furnace units, a combustion system for each of said first and second coil furnace units comprising:

a plurality of burner units;

means for supplying a combustible fluid to each of said plurality of burner units at a controlled rate;

means for supplying a combustible gas to each of said plurality of burner units at a controlled rate, said combustible gas supplying means including a blower unit and a first combustible gas supply line extending from said blower unit to said plurality of burner units;

at least one exhaust duct for directing a flow of combustion products from said plurality of burner units to an exhaust outlet; and at least one recuperator positioned in-line with said exhaust duct and between the first combustible gas supply line and said plurality of burners, said recuperator defining first and second distinct flow paths arranged in heat transfer relationship to one another, said first flow path receiving a flow of high-temperature combustion products from said exhaust duct and the second flow path receiving a flow of combustible gas from said first combustible gas supply line such that, as the flow of combustible gas travels through said recuperator toward said plurality of burner units, the flow of combustible gas is pre-heated by the flow of combustion products.

2. The combustion system of claim 1, further comprising an eductor positioned in-line with said exhaust duct, between said recuperator and an outlet associated with said exhaust duct, said eductor including vacuum creating means connected to said combustible gas supplying means for creating a vacuum in said exhaust duct to draw the flow of combustion products through said recuperator.

3. The combustion system of claim 2, wherein said vacuum creating means includes a venturi formed in said eductor and a combustible gas branch line extending from said combustible gas supplying means to said eductor for directing a flow of gas at a high speed and pressure into said venturi.

4. The combustion system of claim 3, wherein said combustible gas branch line is arranged parallel to said first combustible gas supply line.

5. The combustion system of claim 4, further including a second combustible gas supply line extending from said combustible gas supplying means to said plurality of burner units.

6. The combustion system of claim 5, wherein said second combustible gas supply line is arranged parallel to said combustible gas branch line.

7. The combustion system of claim 2, further comprising first and second sets of said plurality of burner units, each of said first and second sets having a separate recuperator and eductor arranged in series within an associated exhaust duct.

8. The combustion system of claim 7, further including supporting means for structurally interconnecting said eductors in a compact manner with one of said eductors being arranged reverse from and in close proximity to the other eductor.

9. The combustion system of claim 1, wherein said recuperator includes first and second opposing end portions spaced by side portions all of which are interconnected, along with said exhaust duct, to define an enclosure, said first end portion being provided with an intake port and said second end portion being provided with an outlet port, said recuperator further including at least one tube which defines the first flow path through said enclosure from said intake port to said outlet port, said recuperator also including an inlet zone provided in one of said side portions and an outlet zone provided in an opposing one of said side portions, said enclosure, between said inlet and outlet zones, defining the second flow path that is arranged substantially perpendicular to the first flow path.

10. The combustion system of claim 9, wherein said intake port has a smaller cross-sectional area than said outlet port.

11. The combustion system of claim 9, wherein first flow path is defined by a plurality of tubes positioned within said chamber.

12. The combustion system of claim 11, wherein said plurality of tubes are arranged in multiple tiers within said enclosure with each tier including a group of multiple tubes, said recuperator further including a plurality of transfer ducts each of which fluidly interconnects adjacent groups of tubes in successive tiers.

13. The combustion system of claim 12, wherein each tier includes a 3×9 matrix of tubes.

14. The combustion system of claim 12, wherein said recuperator is formed with first, second and third tiers of tubes and first and second transfer ducts, said first transfer duct interconnecting said first and second tiers of tubes at the second end portions of said recuperator and said second transfer duct interconnecting said second and third tiers of tubes at the first end portion of said recuperator.

* * * * *